I. W. MILLER.
CORN PLANTER.
APPLICATION FILED MAY 25, 1911.
1,032,693.
Patented July 16, 1912.
2 SHEETS—SHEET 1.
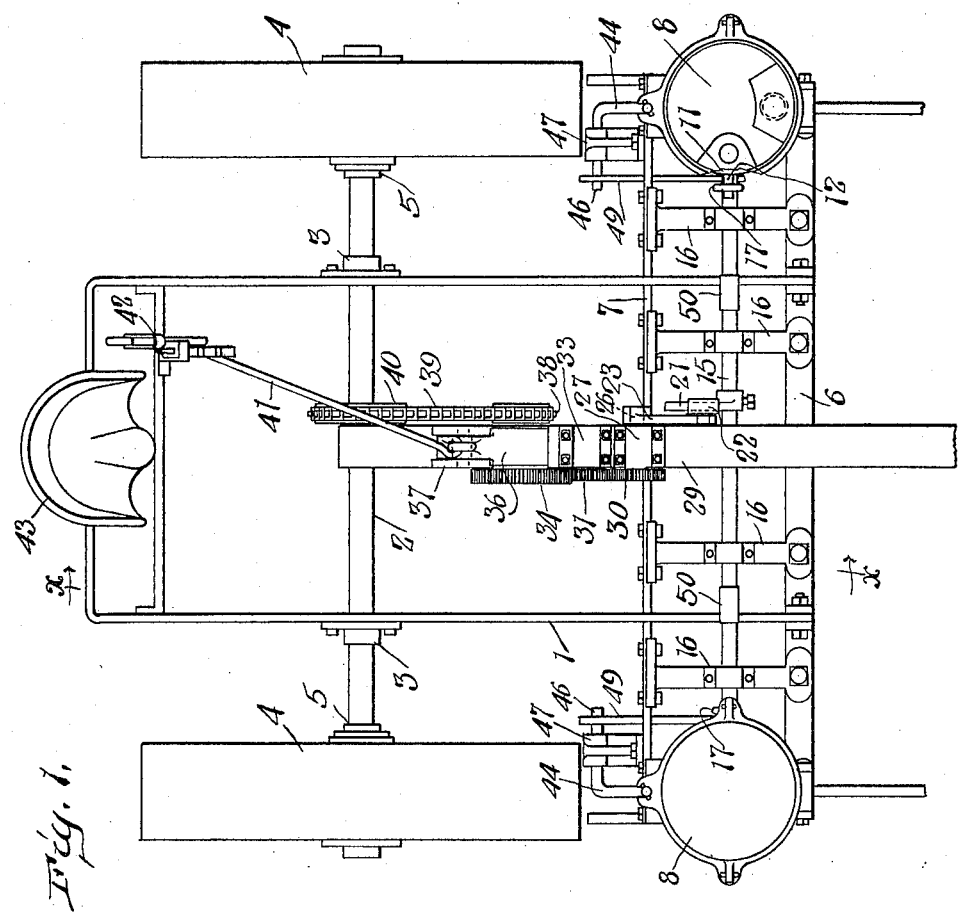
Witnesses
Howard Walmsley
Harriet L. Hanmaker
Inventor
Ingle W. Miller,
By Toulmin & Reed.
Attorneys I. W. MILLER.
CORN PLANTER.
APPLICATION FILED MAY 25, 1911.
1,032,693.
Patented July 16, 1912.
2 SHEETS—SHEET 2.
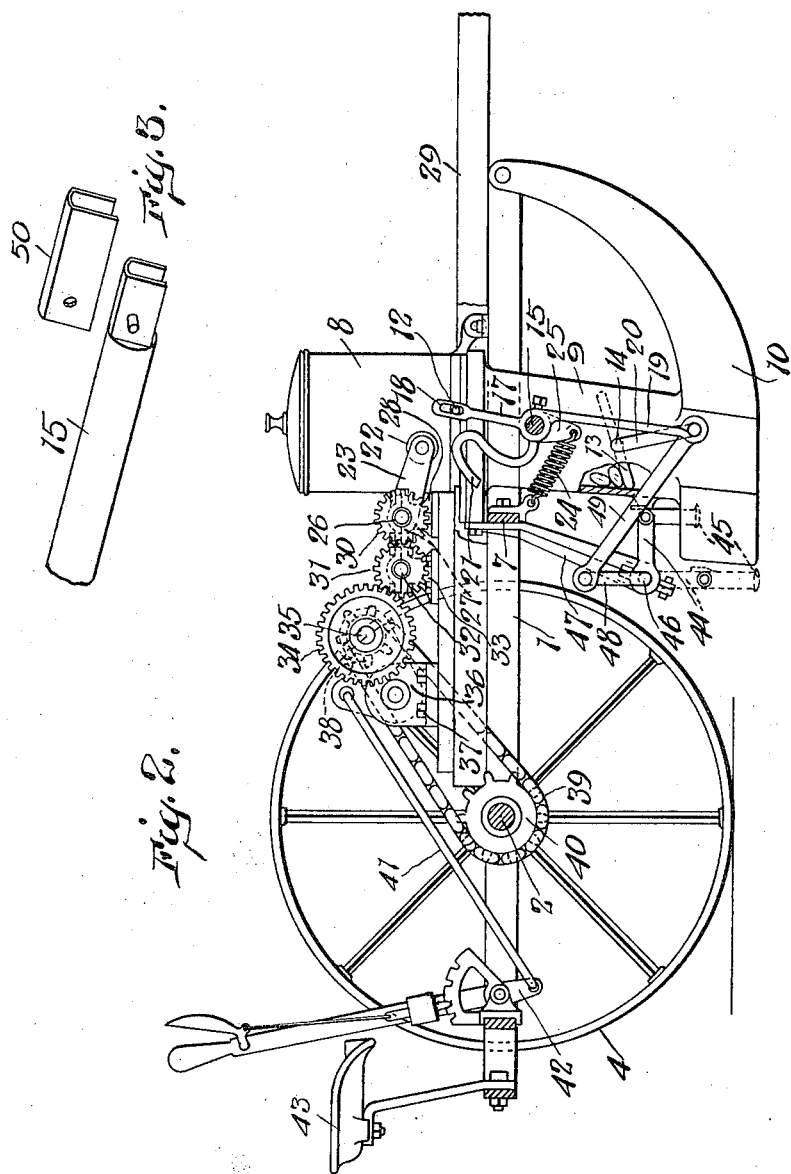
Witnesses
Howard Walmsley
Harriet L. Hammaker
Inventor
Ingle W. Miller,
By Toulmin & Reed
Attorney

UNITED STATES PATENT OFFICE.

INGLE W. MILLER, OF GREENVILLE, OHIO.

CORN-PLANTER.

1,032,693.　　　　　Specification of Letters Patent.　　Patented July 16, 1912.

Application filed May 25, 1911. Serial No. 629,252.

*To all whom it may concern:*

Be it known that I, INGLE W. MILLER, a citizen of the United States, residing at Greenville, in the county of Darke and State of Ohio, have invented certain new and useful Improvements in Corn-Planters, of which the following is a specification, reference being had therein to the accompanying drawing.

This invention relates to corn planters and the object of the invention is to provide a corn planter which will drop the corn at regular intervals and may be controlled to cause the corresponding hills of the several rows to be maintained in proper alinement. To this end it is a further object of the invention to provide means for controlling the passage of the seed from the seed receptacle to the ground and to provide an operating device for said controlling means which is operated from the axle and the operation of which may be controlled by the driver to interrupt the passage of the seed from the seed receptacle to the ground and enable the planter to be properly alined with the hills of preceding rows before any corn is dropped.

It is also an object of the invention to provide a marker operated in unison with the dropping mechanism to mark the point at which each hill of corn is dropped.

In the accompanying drawings, Figure 1 is a top, plan view of a planter embodying my invention; Fig. 2 is a longitudinal, sectional view, taken on the line *x x* of Fig. 1 and looking in the direction of the arrows; and Fig. 3 is a detail view of a portion of the rockshaft.

In these drawings I have illustrated one embodiment of my invention and have shown the same as applied to a planter comprising a main frame 1 supported by an axle 2 which is journaled in bearings 3 carried by said frame. The axle, in turn, is supported by ground wheels 4 mounted on the outer ends of the axle in a manner to cause the axle to rotate therewith. Preferably, a clutch, such as a pawl and ratchet 5, of ordinary construction is interposed between each ground wheel and the axle to permit the axle to rotate independently of the ground wheel, but to cause it to rotate forwardly with the ground wheel. The main frame is provided at its forward portion with transverse members 6 and 7 upon which are mounted the seed receptacles 8.

Extending downward from each receptacle 8 is a tube or boot 9 provided at its lower end with a shoe or furrow opener 10, all of ordinary construction. The passage of the seed through the boot may be controlled by any suitable mechanism. Preferably, however, the passage of the seed from the seed receptacles to the boots is controlled by one set of devices and the discharge of the seed from the boot is controlled by another set of devices. Those devices for controlling the discharge of the seed from the receptacles to the boots are of ordinary construction and, therefore, I have not shown the same in detail but have indicated at 11 in Fig. 1 a portion of one of the plates comprising a part of the seed-feeding mechanism and have shown this plate as provided with an outwardly extending pin 12. The discharge of the grain from the boot is controlled by a cut-off 13 comprising a plate pivotally supported by a shaft 14 mounted in the side walls of the boot and extending beyond the outer surface of one of said side walls. This cut-off is maintained normally in a position to close the boot and prevent the passage of the grain therethrough. In order that these controlling devices may be operated at fixed intervals to drop the corn in hills spaced apart the proper distance I have provided means driven from the axle 2 for actuating both the feed mechanisms in the seed receptacles and the cut-offs 13. In the present form of the mechanism I have provided a transverse rockshaft 15 arranged below the level of the bottoms of the seed receptacles and mounted in suitable bearings 16 carried by the transverse members of the main frame. This shaft has rigidly secured thereto adjacent to each seed receptacle an upwardly extending arm 17 having a slot 18 adapted to receive the pin 12 of the feed plate 11, thereby causing this plate to be shifted each time the rockshaft is actuated. The rockshaft also has rigidly secured thereto a depending arm 19 connected at its lower end to a crank arm 20 rigidly secured to the shaft 14 of the cut-off 13, thereby causing this cut-off to be moved about its axis each time the rock shaft 15 is actuated.

Rocking movement may be imparted to the shaft 15 in any suitable manner, and, as here shown, the shaft 15 has rigidly secured thereto a curved finger 21 arranged to be engaged by a part, such as a roller 22, carried by an arm 23 revolubly mounted on the main frame of the machine. This arm is driven from the axle of the planter, and, on each revolution, the part 22 engages the finger 21 and moves the rockshaft 15 in one direction. A spring 24, connected at one end with an arm 25 rigidly secured to the shaft and at the other end to the transverse member 7 of the main frame, moves the shaft in the opposite direction and retains it normally in a position to maintain the cut-off 13 in approximately a horizontal position, thereby preventing the discharge of the seed from the boot. The arm 23 is preferably mounted on a short transverse shaft 26 journaled in a bearing 27 carried by a bracket 28 adjustably mounted on a part of the main frame. In the present instance the arm 23 and its coöperating parts are mounted upon a tongue 29 which extends some distance in the rear of the transverse members of the main frame. The shaft 26 has rigidly secured thereto a gear 30 with which meshes a second gear 31 mounted on a similar transverse shaft 32 carried by a bearing bracket 33 also mounted on the tongue 29. The gear 31 is an intermediate gear and is driven from a gear 34 carried by a shaft 35 mounted in a suitable bearing formed in a pivoted arm 36, which, in turn, is mounted on an adjustable bracket 37. Mounted on that end of the shaft 35 opposite the gear 34 is a sprocket wheel 38 which is connected by means of sprocket chain 39 with a sprocket wheel 40 rigidly secured to the axle 2. In this manner the rotation of the axle 2 will cause the arm 23 to be revolved and each revolution of this arm will actuate the rockshaft 15 and the seed controlling devices. By varying the ratio of the several gears the speed of rotation of the arm 23 may be varied and the distance between the hills regulated. This variation may be secured by shifting the brackets 28 and 37 to alter the distance between the gears 34 and 30 and thus permit an intermediate gear 31 of a different size to be utilized.

Means are provided under the control of the operator for interrupting the rotation of the arm 23 at the end of each row to permit the planter to be turned and properly alined with the hills of the several preceding rows before any corn is planted. For this purpose I have connected the pivoted arm 36 which carries the gear 34, by means of a rod 41, with a lever 42 mounted near the driver's seat 43 and by means of which he can move the gear 34 into or out of mesh with the intermediate gear 31. To cause the gear to be held securely in either its operative or inoperative position the center of the pivoted arm 31 is arranged slightly out of alinement with the center of the shaft 35 and the axle 2. Consequently, when the gear 34 is in its normal or operative position the pull of the chain 39 will tend to move the same downward and thus hold the gear firmly in mesh with the intermediate gear 31. When the gear is moved into its inoperative position the chain will tend to move the gear rearwardly and will thus prevent its dropping back into mesh with the intermediate gear. I have also provided the planter with a marker which will mark the location of each hill that is planted. This marker is preferably operated simultaneously with the seed-controlling devices, and, as here shown, comprises a two part arm 44, the two parts of which are pivotally connected one to the other. The outer portion of the arm is preferably provided at its free end with an enlarged portion or head 45 designed to make an impression of appreciable size in the surface of the ground. The inner portion of the arm 44 is rigidly secured to a shaft 46 mounted in brackets 47 carried by the main frame of the machine. The shaft 46 is provided with a crank arm 48 connected by a link 49 with the arm 19 which is rigidly secured to the shaft 15 and which actuates the cut-off 13. When movement is imparted to the rockshaft to cause the seed to be discharged from the boot the arm 44 will be moved downward and the further end of the outer section of the arm will engage the ground. The forward movement of the planter will cause the two parts of the arm to be moved into alinement, and, as the length of the complete arm is greater than the distance between the center of the shaft 46 and the surface of the ground, the head 45 of the arm will be forced into the ground either immediately over the seed that was planted or immediately adjacent thereto, thereby indicating clearly the location of the hill. When the rockshaft 15 is moved in the opposite direction the arm 44 will be moved forward and the outer part thereof will move about its point of connection to the inner part of the arm and will thus be lifted out of engagement with the ground without dragging over the same.

The machine is designed for use either with a plurality of seed-feeding devices or with a single seed-feeding device, and, to this end, the rockshaft 15 is divided into a plurality of sections, in the present instance, three. The central portion carries the finger 21 and has the outer portions connected thereto by means of connecting sleeves or devices 50. These connecting devices may be of any suitable character, but, as here shown, each comprises a clip substantially U-shaped in cross section, pivotally connected at one end to one part of the shaft and adapted to engage the adjacent end of another part of the shaft, thus connecting the two parts and causing them to rotate in unison. The amount of rotation of the rockshaft is not sufficient to turn the clips downward so that they might drop into an inoperative position. By moving either of the connecting devices 50 into an inoperative position the corresponding end portion of the rockshaft is disconnected from the central portion thereof and is rendered inoperative, thereby permitting the device to be used to plant a single row.

The operation of the device has been clearly set forth in connection with the description of the several parts thereof and it will be apparent that I have provided a mechanism controlled by the movement of the planter itself for dropping the corn at fixed intervals and for maintaining the corresponding hills of the several rows in their proper relative positions and that I have accomplished this without the use of the check row wire now commonly employed in connection with corn planters. Further, it will be apparent that the mechanism is a simple one and is easily operated and readily controlled by the operator. Further, by connecting the ground wheels to the axle by clutch mechanism which will permit the axle to rotate independently of the wheels I eliminate the probability of the movement of the axle being checked either partially or entirely by one of the ground wheels coming in contact with a clod or other obstruction which would serve to temporarily check this movement. Under such circumstances the continued movement of the other ground wheel would rotate the axle. It is very improbable under ordinary working conditions that the movement of both ground wheels would be simultaneously interrupted. Consequently, there is little liability of the rotation of the axle being checked in a manner which would interfere with the dropping of the corn at regular intervals.

While I have shown and described one mechanism for carrying out my invention it will be understood that this particular mechanism is chosen for the purpose of illustration only, and I do not wish to be limited to the details of construction, for obvious modifications will occur to a person skilled in the art.

Having thus fully described my invention, what I claim as new and desire to secure by Letters Patent, is:—

1. In a planter, the combination, with a frame, an axle mounted on said frame, ground wheels mounted on said axle, a grain receptacle, a boot extending downwardly from said receptacle and adapted to receive the grain therefrom, and means to control the passage of the grain through said boot, of a part for operating said controlling means, a second part for imparting movement to said first-mentioned part, an arm pivotally mounted on said frame, a shaft journaled in said arm and operatively connected to said second-mentioned part and to one of said ground wheels, and means controlled by the driver for moving said arm about its pivotal center to make and break the connection between said shaft and said second-mentioned part.

2. In a planter, the combination, with a frame, an axle rotatably mounted on said frame, ground wheels connected with said axle, a grain receptacle, a boot extending downwardly from said receptacle and adapted to receive grain therefrom, and means to control the passage of the grain through said boot, of a rockshaft operatively connected to said controlling means, a finger connected to said shaft, a bearing bracket mounted on said frame, a shaft journaled in said bearing bracket, an arm carried by said shaft and having a part adapted to engage said finger, a gear carried by said shaft, an arm pivotally supported on said frame and having a bearing, a shaft journaled in said bearing, a gear carried by said shaft and adapted to impart movement to said first mentioned gear, means through which said axle imparts movement to said second-mentioned gear, and means under the control of the driver to move said arm about its pivotal center to make and break the connection between said gears.

3. In a planter, the combination, with a frame, an axle rotatably mounted on said frame, ground wheels connected with said axle, a grain receptacle, a boot extending downwardly from said receptacle and adapted to receive the grain therefrom, and means to control the passage of the grain through said boot, of a rockshaft operatively connected with said controlling means, a finger secured to said shaft, a bearing bracket mounted on said frame, a shaft journaled in said bearing bracket, an arm carried by said shaft and having a part adapted to engage said finger, a gear carried by said shaft, a second bearing bracket, a shaft journaled therein, and an intermediate gear carried by said last-mentioned shaft and meshing with the first-mentioned gear, an arm pivotally supported on said frame and having a bearing, a shaft journaled in said bearing, a gear carried by said shaft and adapted to mesh with said intermediate gear, a sprocket wheel secured to said shaft, a sprocket wheel mounted on said axle, a chain passing about said sprocket wheels, and means controlled by the driver for moving said arm about its pivotal center to move said last-mentioned gear into or out of mesh with said intermediate gear.

4. In a planter, the combination, with a frame, an axle rotatably mounted on said frame, ground wheels connected with said axle, a grain receptacle, a boot extending downwardly from said receptacle and adapted to receive the grain therefrom, and means to control the passage of the grain through said boot, of a rockshaft operatively connected with said controlling means, a finger secured to said shaft, a bearing bracket adjustably mounted on said frame, a shaft journaled therein, an arm secured to said shaft having a part adapted to engage said finger, a gear carried by said shaft, an intermediate gear meshing with the first-mentioned gear, a second bracket adjustably mounted on said frame, an arm carried by said bracket and having a bearing, a shaft journaled in said bearing, a gear carried by said shaft and adapted to mesh with said intermediate gear, a connection between said shaft and said axle, and means controlled by the operator for moving said arm about its pivotal center to move said last-mentioned gear into or out of mesh with said intermediate gear.

5. In a planter, the combination, with a frame, an axle rotatably mounted on said frame, ground wheels connected with said axle, a grain receptacle, and a boot extending downward from said receptacle and adapted to receive the grain therefrom, of a shaft extending transversely to said boot, a cut-off carried by said shaft within said boot, a crank arm connected with said shaft without said boot, a rockshaft, an arm rigidly secured to said rockshaft and connected with said crank arm, a shaft supported from said main frame, a marker carried by said shaft, a crank arm secured to said shaft, and a link connecting said crank arm with the arm rigidly secured to said rockshaft, whereby said marker and said cut-off are operated in unison.

6. In a planter, the combination, with a frame, an axle rotatably mounted in said frame, ground wheels connected with said axle, a grain receptacle, a boot extending downwardly from said receptacle and adapted to receive the grain therefrom, and means to control the passage of the grain through said boot, of an arm for operating said controlling means, a gear for operating said arm, a second gear, means for connecting said second gear with said first gear and for disconnecting the same therefrom, and means for operatively connecting said second gear with said axle and adapted to hold said gears in either operative or inoperative relation.

In testimony whereof, I affix my signature in presence of two witnesses.

INGLE W. MILLER.

Witnesses:
JEANETTE LONGENECKER,
ESTHER STEVENSON.

---

Copies of this patent may be obtained for five cents each, by addressing the "Commissioner of Patents, Washington, D. C."